United States Patent [19]

Köpf et al.

[11] 4,217,118
[45] Aug. 12, 1980

[54] AIR INTAKE FILTER WITH CYCLONE SEPARATOR STAGE AND DUST COLLECTION PAN

[75] Inventors: Rudi Köpf, Heutingsheim; Walter Trefz, Weiler zum Stein, both of Fed. Rep. of Germany

[73] Assignee: Filterwerk Mann & Hummel GmbH, Ludwigsburg, Fed. Rep. of Germany

[21] Appl. No.: 971,511

[22] Filed: Dec. 20, 1978

[30] Foreign Application Priority Data

Dec. 20, 1977 [DE] Fed. Rep. of Germany ....... 2756751

[51] Int. Cl.² .............................................. B01D 50/00
[52] U.S. Cl. ........................................ 55/330; 55/337; 55/395; 55/397; 55/424
[58] Field of Search .................. 55/330, 337, 395–398, 55/424, 426, 428, 457, 466, 459 C; 209/144

[56] References Cited

U.S. PATENT DOCUMENTS

| 1,689,104 | 10/1928 | Bennett | 55/397 |
| 1,755,319 | 4/1930 | Donaldson | 55/428 |
| 1,823,301 | 9/1931 | Walker | 55/459 C |
| 2,214,658 | 9/1940 | Browning | 55/398 |
| 3,078,650 | 2/1963 | Anderson et al. | 55/337 |
| 3,269,097 | 8/1966 | German | 55/426 |
| 3,731,467 | 5/1973 | Jennings | 55/459 C |
| 3,820,310 | 6/1974 | Fromknecht | 55/459 C |

FOREIGN PATENT DOCUMENTS

6930431 7/1969 Fed. Rep. of Germany.
2046642 10/1977 Fed. Rep. of Germany.
456512 11/1936 United Kingdom ..................... 55/397

*Primary Examiner*—David L. Lacey
*Attorney, Agent, or Firm*—Joseph A. Geiger

[57] ABSTRACT

Air intake filter for combustion engines and other air-aspirating machinery operating under dusty conditions, the filter assembly having a cyclone separator stage and a dust collecting pan which is separated from the filter cartridge and cyclone chamber by a partition wall. The partition wall has a dust discharge opening with a fin-like guide baffle extending inwardly from the partition wall, the guide baffle having a circumferential wall portion and an arcuate radially inwardly pointing wall portion, thereby deflecting the dust particles away from the dust discharge opening.

7 Claims, 5 Drawing Figures

AIR INTAKE FILTER WITH CYCLONE SEPARATOR STAGE AND DUST COLLECTION PAN

BACKGROUND OF THE INVENTION

1. Field of the Invention

The present invention relates to air intake filters for combustion engines, compressors, and other air-aspirating machinery and, more particularly, to an air intake filter having a cyclone separator stage arranged upstream of a strainer-type filter element and a dust collecting pan arranged at one end of the filter housing.

2. Description of the Prior Art

Air intake filters with a cyclone separator stage are advantageously used in connection with internal combustion engines, compressors, and other air-aspirating machinery which are required to operate under dusty conditions. This applies particularly to agricultural machinery, such as tractors and harvesting combines, as well as to trucks and other machinery which are used on construction sites.

Known air intake filters with a cyclone separator stage are disclosed in U.S. Pat. No. 3,078,650, in German Auslegeschrift (Published Allowed Application) No. 20 46 642, and in German Gebrauchsmuster (Utility Model) No. 69 30 431. In each case, the incoming raw air is subjected to a centrifugal action within an annular flow space which surrounds a finely porous filter element. The air flows radially inwardly through the filter element, towards a clean air outlet. This centrifugal action, in what is generally referred to as a cyclone separator stage, removes from the dust-laden raw air a major portion of the dust particles which would otherwise quickly clog up the air filter element.

In all three of the prior art air intake filters mentioned, the centrifuged dust particles are made to accumulate inside a dust collecting chamber, or dust pan, which is arranged axially adjacent to the filter element, on one extremity of the filter housing. A partition wall separates the dust collecting chamber from the filter element and from the surrounding cyclone separator stage. In the air filter assembly of German Ausleges-chrift No. 20 46 642, the centrifuged dust particles are discharged into the dust collecting pan through a narrow peripheral gap between the partition wall and the outside wall of the dust collecting pan. The air filter assemblies of U.S. Pat. No. 3,078,650 and of German Gebrauchsmuster No. 69 30 431 feature a discharge opening near the periphery of the partition wall.

It has now been found that, under certain air flow conditions, especially when they are of a pulsating nature, the swirling air in the cyclone separator stage may entrain with it dust particles which had previously been deposited in the dust collecting pan. This condition can become particularly annoying in connection with a peripheral discharge gap of the type which is suggested in German Gebrauchsmuster No. 69 30 431. In order to counteract this problem, the latter suggests the arrangement of inclined baffle vanes inside the dust collecting pan, underneath the partition wall. These baffles are intended to oppose and brake the swirling air flow inside the dust collecting pan, so that it should not reach the accumulated dust particles.

A similar dust entrainment problem may likewise be encountered in connection with air intake filter assemblies which, in the place of the peripheral gap around the partition wall, have a simple discharge opening near the outside wall. The dust entrainment condition is again most severe, when the air flow is a pulsating one.

SUMMARY OF THE INVENTION

It is a primary objective of the present invention to suggest an improvement in connection with air intake filters of the above-mentioned type, especially of the type which have a dust discharge opening in the partition wall between the cyclone separator stage and the dust collecting pan.

The present invention proposes to attain this objective by suggesting that a dust-deflecting guide baffle be arranged on the underside of the partition wall, circumferentially behind the dust discharge opening, in such a way that the dust particles passing through the discharge opening are deflected radially inwardly and axially away from the partition wall. Such a guide baffle effectively prevents the reentrainment of dust particles from the dust collecting pan through the discharge opening.

It has been found, through experimentation, that the mere deflection of the dust particles in the axial direction towards the bottom of the dust collecting pan, while removing the dust from the immediate vicinity of the dust discharge opening, does not achieve the desired purpose satisfactorily. Only, when an additional radially inwardly directed deflection of the dust particles is provided, does the desired result of retention of the dust particles inside the dust collecting pan follow.

The suggested novel dust-deflecting guide baffle offers the additional advantage that an air intake filter thus equipped can also be used in a horizontally oriented arrangement, provided that the dust discharge opening is arranged in the upper portion of the (now vertical) partition wall.

In a preferred embodiment of the invention, the partition wall is made of injection-molded plastic material and the dust-deflecting guide baffle takes the form of a fin-like, axially oriented integral wall extension which flanks the dust discharge opening on its radially outer edge and which reaches circumferentially beyond said opening, having an arcuate end portion with an extremity which is oriented substantially radially inwardly, towards the center of the dust collecting pan. In this way, it is possible to impliment the proposed improvement at a minimal additional cost.

Surprisingly, the novel dust-deflecting guide baffle shows great effectiveness, even with comparatively small dimensions for the baffle. It has been found, for example, that the dimensional relationships between (a) the radial width of the dust discharge opening, (b) the radial inward projection of the guide baffle, (c) the axial height of the guide baffle, and (d) the maximum circumferential spacing between the guide baffle and the rear edge of the dust discharge opening may vary between 1:0.5:0.5:0 and 1:5:5:7. The preferred dimensional relationship is 1:1:1:1.

BRIEF DESCRIPTION OF THE DRAWINGS

Further special features and advantages of the invention will become apparent from the description following below, when taken together with the accompanying drawings which illustrate, by way of example, two embodiments of the invention which are represented in the various figures as follows.

DESCRIPTION OF THE PREFERRED EMBODIMENTS

Figure 1:
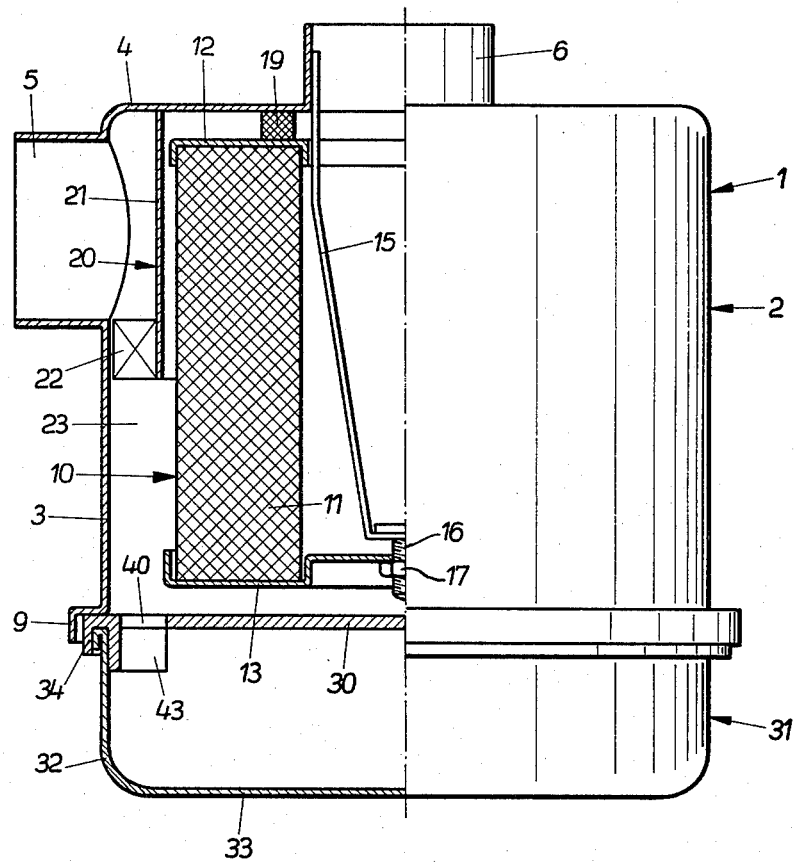
FIG. 1 shows a complete air intake filter assembly, partially cross-sectioned, including a cyclone separator stage and a dust collecting pan, with a structure embodying the present invention.

Referring to FIG. 1 of the drawing, there can be seen an air intake filter assembly, the left-hand side of the figure showing the assembly in a longitudinal cross section. The filter assembly 1 consists essentially of a filter housing 2 in the shape of an inverted pot, having a cylindrical housing wall 3 and a top wall 4. Near the top wall 4, the housing wall 3 has an opening with a radially oriented raw air inlet connector 5. A similar opening is arranged in the center of the top wall 4, for an axially oriented clean air outlet connector 6.

Inside the pot-shaped filter housing 2 is arranged a filter cartridge 10, holding a hollow-cylindrical filter element 11 between axially oppositely arranged end covers 12 and 13. A supporting yoke 15, attached to the inner wall of the clean air outlet connector 6, reaches axially through the filter element 11, carrying on its far extremity a threaded stud 16 which reaches through a central bore of the end cover 13 and, with the aid of a nut 17, clamps the filter cartridge 10 against the top wall 4 of filter housing 1. Between the upper end cover 12 and the top wall 4 is interposed a compressible gasket 19.

As can be seen in FIG. 1, the diameter of the filter housing wall 3 is considerably larger than the outer diameter of the filter cartridge 10, so as to form an annular space therebetween. Inside this annular space is arranged an air guide assembly 20 whose purpose it is to impose on the incoming raw air a cyclone-like, helically swirling flow. The air guide assembly 10 consists of a baffle cylinder 21 and a series of inclined deflector vanes 22. The baffle cylinder 21 extends downwardly from the housing top wall 4, so as to face the raw air inlet connector 5. This baffle cylinder 21 and the deflector vanes 22 which are attached to its lower extremity impose on the incoming raw air a flow direction that is oriented axially downwardly and circumferentially around the filter cartridge 10. The annular space 23 located axially below the deflector vanes 22 thus becomes a cyclone chamber inside which the dust particles entrained by the swirling raw air are centrifuged, i.e. projected outwardly against the filter housing wall 3 and axially downwardly, away from the filter cartridge 10.

In the axially downstream direction, the cyclone chamber 23 is delimited by a radial partition wall 30 which is supported by the filter housing 2 and which, together with the latter, forms an enclosure for the filter cartridge 10. On the axially outer side of the partition wall 30 is arranged a dust collecting pan 31. This pan consists of a cylindrical wall 32 and a bottom wall 33, the wall 32 having preferably the same diameter as the filter housing wall 3. A collar 34 on the rim of the dust collecting pan 31 engages a matching collar of the partition wall 30, being clamped against, and centered by, a receiving flange 9 of the filter housing 2. This clamping action is obtained by known lid clamps of the knee-lever type (not shown).

Figure 2:
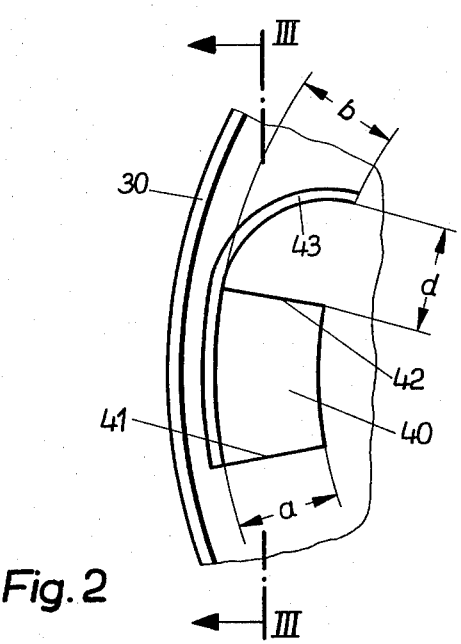
FIG. 2 shows an enlarged detail of the filter assembly of FIG. 1, in the area of the dust discharge opening into the dust collecting pan, as seen from below.
Figure 3:
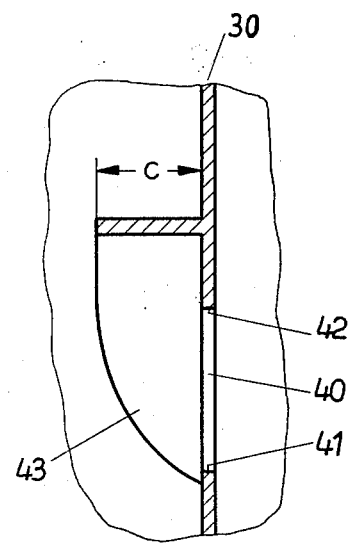
FIG. 3 is a cross section along line III—III of FIG. 2.

In the vicinity of the periphery of the partition wall 30, i.e. axially in line with the cyclone chamber 23, the partition wall 30 has a dust discharge opening 40 through which the centrifuged dust particles pass into the dust collecting pan 31. This dust discharge opening and its surrounding structure are shown in greater detail in FIGS. 2 and 3, FIG. 2 showing the discharge opening 40 as seen from the inside of the dust collecting pan 31. The opening 40 has a four-sided outline, consisting of parallel inner and outer circumferential sides and radially oriented front and rear sides 41 and 42, respectively. The designations "front" and "rear" are to be understood as seen in the downstream direction of the circumferential motion component of the helically swirling air flow.

Alongside the dust discharge opening 40 is arranged a guide baffle 43, in the form of an axially oriented fin-like wall member which is integrally attached to the partition wall 30, on the side of the dust collecting chamber. The guide baffle 43 consists of a circumferentially oriented wall portion which is arranged in alignment with the outer circumferential side of the dust discharge opening 40, and an adjoining arcuate wall portion reaching behind the dust discharge opening and having an extremity which is oriented radially inwardly, so as to deflect the passing dust particles in that direction.

In FIGS. 2 and 3, the principle dimensions of the dust discharge opening 40 and of the guide baffle 43 are indicated by the letters a through d, dimension a being the radial width of the dust discharge opening 40, dimension b being the radial inward projection of the guide baffle 43, dimension c being the axial height of the guide baffle 43, and dimension d being the maximum circumferential spacing between the guide baffle 43 and the rear edge 42 of the dust discharge opening 40. In the preferred embodiment of the invention, as illustrated in FIGS. 2 and 3, the relationship between these dimensions is preferably a:b:c:d equal 1:1:1:1, , meaning that the dimensions a through d are all identical. It has been found, however, that satisfactory results are obtainable with dimensions a through d varying as widely as a:b:c:d equal 1:0.5:0.5:0 and a:b:c:d equal 1:5:5:7. In the case of d equals zero, the radial portion of the guide baffle 53 would be positioned below the rear edge 42 of the discharge opening 40.

Figure 4:
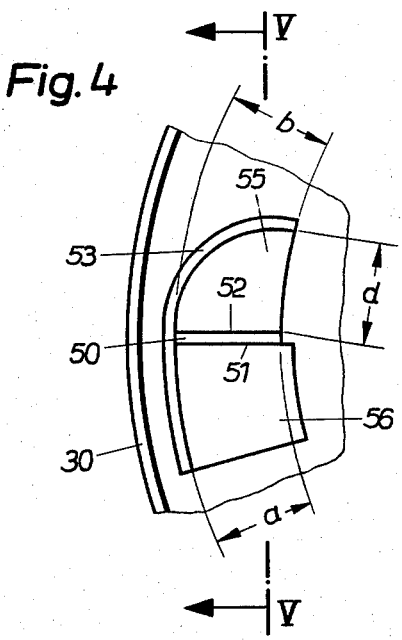
FIG. 4 is similar to FIG. 2, showing a second embodiment of the invention.
Figure 5:
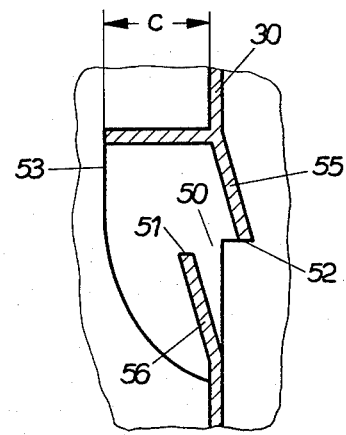
FIG. 5 is a cross section along V—V of FIG. 4.

FIGS. 4 and 5 show a different embodiment of the invention, where the dust discharge opening 50 in the partition wall 30 is oriented differently, facing circumferentially against the direction in which the dust particles are entrained by the helically swirling air flow. For this purpose, the partition wall 30 forms opposing upper and lower tongues 55 and 56, respectively, these tongues being so inclined that the exposed edge 52 of the upper tongue 55 is raised, while the exposed edge 51 of the lower tongue 56 is lowered, so that the two tongues form an inclined discharge channel.

The guide baffle 53 of this embodiment is similar to the guide baffle 43 of the previously described embodiment, having a circumferential wall portion in alignment with the outer circumferential edge of the lower tongue 56 and of the opening 50, and an adjoining arcuate wall portion with a radially inwardly oriented extremity. The latter is again located at a distance behind the rear radial edge 52 of the dust discharge opening. As in the previously described embodiment, the dimensional relationship between the four dimensions a through d of this embodiment is preferably a:b:c:d equal 1:1:1:1, i.e. the dimensions a through d are preferably identical.

In both embodiments, the dust-carrying raw air is drawn into the filter housing 2 through the raw air inlet connector 5, being deflected by the vanes 22 of the air guide assembly 20 into a partially axial and partially circumferential, i.e. helical, cyclone-type swirling flow. This swirling flow causes the dust particles to be centrifuged against the housing wall 3 along which they will advance in the axial direction towards the partition wall 30. As a result of continued rotational movement along the partition wall 30, the dust particles will finally reach the dust discharge opening 40 or 50, respectively, passing through the latter into the dust collecting pan 31. However, in doing so, the dust particles are deflected radially inwardly towards the center of the dust collecting pan 31 and axially downwardly, towards the bottom 33 of pan 31. This deflection of the dust particles, away from the dust discharge opening safely prevents the reentrainment of previously centrifuged dust particles through the dust discharge opening by a pulsating swirling air flow. The thus partially cleaned raw air leaves the cyclone chamber 23 by passing radially inwardly through the filter element 11, exiting from the filter assembly as clean air, through the clean air outlet connector 6.

The filter assembly under consideration is not limited to use in a vertical orientation, but can also be employed in an inclined, or even horizontal, orientation in which case the dust discharge opening would preferably be arranged on the highest point of the partition wall.

It should be understood, of course, that the foregoing disclosure describes only preferred embodiments of the invention and that it is intended to cover all changes and modifications of these examples of the invention which fall within the scope of the appended claims.

We claim the following:

1. An air intake filter assembly of the type which includes a generally pot-shaped filter housing with a longitudinal center axis, air inlet and outlet openings, a strainer-type filter element arranged centrally within the housing, and an annular space between the filter element and the housing wall and centrifuging means for causing the incoming raw air to be subjected to a dust-centrifuging helically swirling flow, prior to entering the filter element, said assembly, comprising:
    a dust collecting chamber which is arranged axially adjacent to said filter element and its surrounding annular space, on the axially downstream side of said helically swirling flow, said chamber being defined by a dust collecting pan which is connected to the filter housing and includes a substantially radially extending partition wall separating said annular space from the inside of the dust collecting pan;
    a dust discharge opening in the partition wall of the dust collecting pan, leading from said annular space into the dust collecting chamber; and
    a dust guide baffle arranged on the inside of the dust collecting pan, in association with its dust discharge opening, the dust guide baffle being so oriented that the dust particles passing through said opening, as a result of said helically swirling flow, are deflected radially towards the center of the dust collecting chamber.

2. The assembly as defined in claim 1, wherein
    the dust guide baffle is a fin-shaped wall member which extends from the partition wall an axial distance into the collecting chamber, said wall member having a circumferentially oriented wall portion which is located radially outside the dust discharge opening and an adjoining dust deflecting wall portion which is curved radially inwardly towards a radial orientation and located circumferentially downstream of the dust discharge opening.

3. The assembly as defined in claim 2, wherein
    the dust discharge opening has a four-sided outline, with inner and outer circumferentially oriented sides and front and rear radially oriented sides, as seen in the circumferentially downstream direction;
    the circumferentially oriented wall portion of the guide baffle is located in alignment with the outer circumferential side of the dust discharge opening; and
    the curved dust deflecting wall portion of the guide baffle is located at a distance from the rear radial side of the dust discharge opening.

4. The assembly as defined in claim 3, wherein
    the dimensional relationship between the radial width a of the discharge opening, the radial inward projection b of the dust deflecting wall portion of the dust guide baffle from its circumferential wall portion, the axial extent c of the dust guide baffle, and the maximum circumferential spacing d between said dust deflecting baffle portion and the rear side of the dust discharge opening is comprised between a:b:c:d equal 1:0.5:0.5:0 and a:b:c:d equal 1:5:5:7.

5. The assembly as defined in claim 4, wherein
    said dimensional relationship is a:b:c:d equal 1:1:1:1 or a=b=c=d.

6. The assembly defined in claim 2, wherein
    the dust discharge opening is formed by two inclined tongue portions of the partition wall: a first tongue portion presenting a trailing edge which is inclined towards the inside of the dust collecting chamber, and a second tongue portion presenting a leading edge which is inclined away from the dust collecting chamber, the two inclined tongue portions thereby defining between them a dust discharge opening which is oriented against the helically swirling air flow.

7. The assembly as defined in claim 6, wherein
    the dust discharge opening has a four-sided outline, with inner and outer circumferentially oriented sides and two radially oriented sides, the latter being defined by said trailing and leading edges, respectively, of the two inclined tongue portions.

* * * * *